(12) United States Patent
Smith

(10) Patent No.: US 8,340,648 B2
(45) Date of Patent: *Dec. 25, 2012

(54) METHODS AND SYSTEMS FOR DELIVERING TRAVEL-RELATED INFORMATION

(75) Inventor: Benjamin V. Smith, Maylene, AL (US)

(73) Assignee: AT&T Intellectual Property I, LP, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/174,983

(22) Filed: Jul. 1, 2011

(65) Prior Publication Data

US 2011/0320110 A1 Dec. 29, 2011

Related U.S. Application Data

(63) Continuation of application No. 11/459,879, filed on Jul. 25, 2006, now Pat. No. 7,995,999, which is a continuation of application No. 10/237,346, filed on Sep. 9, 2002, now Pat. No. 7,162,254.

(51) Int. Cl.
*H04L 29/06* (2006.01)

(52) U.S. Cl. .............. 455/414.3; 455/414.2; 455/456.3; 455/404.2; 701/117

(58) Field of Classification Search .............. 455/414.3, 455/414.2, 456.3, 404.2
See application file for complete search history.

(56) References Cited

U.S. PATENT DOCUMENTS

| | | | |
|---|---|---|---|
| 4,278,844 A | 7/1981 | Jones | |
| 4,792,803 A | 12/1988 | Madnick et al. | |
| 5,060,255 A | 10/1991 | Brown | |
| 5,177,685 A | 1/1993 | Davis et al. | |
| 5,333,180 A | 7/1994 | Brown | |
| 5,438,568 A | 8/1995 | Weisser, Jr. | |
| 5,465,289 A | 11/1995 | Kennedy, Jr. | |
| 5,583,976 A | 12/1996 | Bullard, Jr. | |
| 5,586,169 A | 12/1996 | Pinard | |
| 5,596,627 A | 1/1997 | Solomon et al. | |
| 5,742,905 A | 4/1998 | Pepe et al. | |
| 5,854,835 A | 12/1998 | Montgomery | |
| 5,854,836 A | 12/1998 | Nimmagadda | |
| 5,867,498 A | 2/1999 | Gillman et al. | |
| 5,999,611 A | 12/1999 | Tatchell et al. | |
| 6,009,409 A | 12/1999 | Adler et al. | |
| 6,052,598 A | 4/2000 | Rudrapatna et al. | |
| 6,160,877 A | 12/2000 | Tatchell et al. | |
| 6,161,128 A | 12/2000 | Smyk | |
| 6,181,996 B1 | 1/2001 | Chou et al. | |
| 6,188,757 B1 | 2/2001 | Malik | |
| 6,249,808 B1 | 6/2001 | Seshadri | |

(Continued)

OTHER PUBLICATIONS

SF Bay Traffic.info, http://www.sfbaytraffic.info/aboutus/htm.

(Continued)

*Primary Examiner* — Wayne Cai
*Assistant Examiner* — Chuck Huynh
(74) *Attorney, Agent, or Firm* — Parks IP Law LLC; Jennifer P. Medlin, Esq.

(57) ABSTRACT

Methods and systems are provided for delivering travel related information with an intelligent network. One method embodiment includes establishing a communication with the intelligent network through an access device, determining a location of the access device, and obtaining the travel-related information with the access device through the intelligent network, wherein the travel-related information includes data related to a location of the access device. Additional system and computer-readable media embodiments of the present methods and systems are also provided.

9 Claims, 3 Drawing Sheets

U.S. PATENT DOCUMENTS

| | | | |
|---|---|---|---|
| 6,282,281 B1 | 8/2001 | Low | |
| 6,298,122 B1 | 10/2001 | Horne | |
| 6,310,939 B1 | 10/2001 | Varney | |
| 6,317,058 B1 | 11/2001 | Lemelson et al. | |
| 6,377,993 B1 | 4/2002 | Brandt | |
| 6,381,316 B2 | 4/2002 | Joyce et al. | |
| 6,480,783 B1 | 11/2002 | Myr | |
| 6,556,997 B1 | 4/2003 | Levy | |
| 6,647,106 B1 | 11/2003 | Hussain et al. | |
| 6,650,902 B1 | 11/2003 | Richton | |
| 6,677,894 B2 * | 1/2004 | Sheynblat et al. | 342/357.46 |
| 6,741,188 B1 | 5/2004 | Miller et al. | |
| 6,785,551 B1 | 8/2004 | Richard | |
| 6,850,766 B2 * | 2/2005 | Lau et al. | 455/456.1 |
| 6,879,838 B2 | 4/2005 | Rankin et al. | |
| 6,888,929 B1 | 5/2005 | Saylor et al. | |
| 7,062,279 B2 | 6/2006 | Cedervall et al. | |
| 7,995,999 B2 * | 8/2011 | Smith | 455/414.3 |
| 2001/0029425 A1 | 10/2001 | Myr | |
| 2001/0036258 A1 | 11/2001 | Sugla | |
| 2001/0046280 A1 | 11/2001 | Crockett | |
| 2002/0027512 A1 | 3/2002 | Horita et al. | |
| 2002/0036584 A1 | 3/2002 | Jocoy et al. | |
| 2002/0052848 A1 | 5/2002 | Kawai et al. | |
| 2002/0085698 A1 | 7/2002 | Liebenow | |
| 2002/0101360 A1 | 8/2002 | Schrage | |
| 2002/0126708 A1 | 9/2002 | Skog | |
| 2003/0039340 A1 | 2/2003 | Deshpande et al. | |
| 2003/0043983 A1 | 3/2003 | Pelletier | |
| 2004/0246147 A1 * | 12/2004 | von Grabe | 340/995.13 |

OTHER PUBLICATIONS

SF Bay Traffic.info, http://www.sfbaytraffic.info/cgi-bin/welcom.cgi.

SF Bay Traffic.info, http://www.sfbaytraffic.info/howitworks.htm.

"Cingular Wireless Selects TruPosition(R) as Location Technology Provider for its Nationwide Wireless Network", http://www.trueposition.com/news_cingular.html.

"Welcome to Broadband Land", Home Toys Article, http://www.hometoys.com/hlinews/oct99/articles/panja.htm.

"Engaging Your World Through voice", Hey Anita, http://www.heyanita.com/p_login2.asp.

"TrafficMode—Current Traffic Information Systems", http://www.trafficmode.com/page714214.htm.

IEC: Wireless Intelligent Network (WIN)—Unique Service Requirements of Wireless, http://www.iec.org/online/tutorials/win/topic01.html?Back.x=17&Bac.y=14.

IEC: Wireless Intelligent Network (WIN)—Examples of WIN Services, http://www.iec.org/online/tutorials/Win/topic02.html?Next.x=38&Next.y=13.

IEC: Wireless intelligent Network (WIN)—Functional Components of a WIN, http://www.iec.org/online/tutorials/win/topic03.html?Next.x=35&Nexty=14.

IEC: Wireless Intelligent Network (WIN)—A Stand-Alone HLR: The First Step in a WIN Strategy, http://www.iec.org/online/tutorials/win/topic04.html?Next.x=37&Next.y=17.

IEC: Wireless Intelligent Network (WIN)—The Current Status of WIN Standards, http://www.iec.org/oniine/tutorials/win/topic05.html?Next.x=36&Next.y=13.

Bell Labs Technology: Understanding Wireless Mobile Communications, http://www.bell-labs.com/technology/wireless/.

Bell Labs Technology: Mobile wireless means wireless access, http://www.bell-labs.com/technolgy/wireless/mobileaccess.html.

Bell Labs Technology: Early mobile telephone service, http://www.bell-labs.com/technology/wireless/earlyservice.html.

Bell Labs Technology: What's the difference between 'cellular' and 'PCS'?, http://www.bell-labs.com/technology/wireless/difference.html.

Bell Labs Technology: What is a 'cell'?, http://www.bell-labs.com/technology/wireless/cell.html.

Bell Labs Technology: Slicing up the cellular pie, http://www.bell-labs.com/technology/wireless/pie.html.

Bell Labs Technology: How is a mobile system designed?, http://www.bell-labs.com/technology/wireless/design.html.

Bell Labs Technology: Let's make a mobile phone call, http://www.bell-labs.com/technology/wireless/call.html.

Bell Labs Technology: How does a mobile call reach its destination?, http://www.bell-labs.com/technology/wireless/destination.html.

Bell Labs Technology: How do I receive a mobile call?, http:www.bell-labs.com/technology/wireless/receive.html.

Bell Labs Technology: Switching a mobile call at 55 miles per hour, http://www.bell-labs.com/technology/wireless/switching.html.

Bell Labs Technology: A 'soft' handoff for improved service, http://www.bell-labs.com/technology/wireless/soft.html.

Bell Labs Technology: What if I've moved out of my service provider's area?, http://www.bell-labs.com/technology/wireless/moved.html.

Bell Labs Technology: Pinpointing your location, http://www.bell-labs.com/technology/wireless/pinpoint.html.

Bell Labs Technology: What's hot today? Wireless Datal, http://www.bell-labs/technology/wireless/holdata.html.

Bell Labs Technology: There are some limits on wireless data transmission, http://www.bell-labs.com/technology/wireless/limitsondata.html.

Bell Labs Technology: Customers want more data services, http://www.bell-labs.com/technology/wireless/customerswantdata.html.

Bell Labs Technology: Too many technological standards, http://www.bell-labs.com/technology/wireless/standards.html.

Bell Labs Technology: Lucent's support of international standards, http://www.bell-labs.com/technology/wireless/lucent.html.

Bell Labs Technology: Focusing on wireless transmission—everywhere, http://www.bell-labs.com/technology/wireless/everywhere.html.

Bell Labs Technology: How is Lucent fueling the Untethered Revolution?, http://www.bell-labs.com/technology/wireless/fueling.html.

SMS Services, Template No. 8, http://www.cointel.co.za.smsservices/frame.htm.

HeyAnita—Engaging your world through voice, http://www.heyanita.com/Technologyt_products.asp.

Morri, Aldo, Sr., "Telematics Paradigm Shift: Industry Strategies Mature as Business Model Realities Sink in", http:www.strategisgroup.com/press/findings.asp?ObjectId=48624&HomePage=True.

Position Location Solutions, Qualcomm, www.cdmatech.com/soluction/pdf/positionlocation.pdf.

Wang et al., "Wireless Voice-over-IP and Implications for Third-Generation Network Design", Bell Labs Tech J, pp. 79-97 (Jul.-Sep. 1998).

how 911 works, BellSouth, http://contact.bellsouth.com/email/bbs/phase2/how911works.htrnl.

* cited by examiner

METHODS AND SYSTEMS FOR DELIVERING TRAVEL-RELATED INFORMATION

CROSS REFERENCE TO RELATED APPLICATIONS

This application is a continuation of U.S. application Ser. No. 11/459,879, filed Jul. 25, 2006, which is a continuation of U.S. application Ser. No. 10/237,346, filed Sep. 9, 2002, the entireties of which are herein incorporated by reference.

BACKGROUND

The present methods and systems are generally related to methods and systems for communicating information. The present methods and systems are more particularly related to methods and systems for communicating travel-related information.

Travelers deal with traffic and weather conditions every day. Those travelers who are forced to use (or who are unfortunate or uninformed enough to choose) relatively congested routes, or routes experiencing adverse weather conditions, can be subject to excessive travel time. Local radio and television stations attempt to relieve this problem by broadcasting reports. Television reports can provide traffic and weather information, but typically cannot be accessed while a traveler is in transit. Radio reports can broadcast traffic information accessible while the traveler is in transit, however such reports often cover the entire listening area of a station. As a result, the information related to the specific location of a traveler can be interspersed with a great deal of useless information, or omitted altogether. Also, both radio and television reports are typically broadcast only at certain time intervals. Often, by the time information relevant to the situation of the traveler is received, the traveler is already committed to a route of travel.

The advent of the mobile telephone spawned new attempts to solve traveler-related problems. There are some existing methods and systems that can alert the traveler of traffic congestion via a mobile telephone. Like television and radio reports, however, these alerts typically provide the traveler with more information than is required and are not typically available on demand. Other existing methods and systems allow the traveler to access traffic data relating to a route of travel through a menu prompt. These methods and systems can be cumbersome and dangerous, however, as they may require the traveler to navigate numerous menus and buttons while driving.

What are needed are methods and systems that can provide in real-time or near real-time traffic and weather information related to a location of interest to a traveler.

SUMMARY

In one embodiment, the present methods and systems are directed to a method of obtaining travel-related information with an intelligent network. The method includes, establishing a communication with the intelligent network through an access device, determining a location of the access device, and obtaining the travel-related information with the access device through the intelligent network, wherein the travel-related information includes data related to a location of the access device.

In one embodiment, the present methods and systems are directed to a system of delivering travel-related information with an intelligent network. The system includes an access device, means for determining a location of the access device, and means for obtaining the travel-related information with the access device through the intelligent network, wherein the travel-related information includes data related to a location of the access device.

In one embodiment, the present methods and systems are directed to a computer-readable medium containing instructions for performing methods for obtaining travel-related information with an intelligent network. The method includes establishing a communication with the intelligent network through an access device, determining a location of the access device, and obtaining the travel-related information with the access device through the intelligent network, wherein the travel-related information includes data related to a location of the access device.

BRIEF DESCRIPTION OF THE DRAWINGS

For the present methods and systems to be clearly understood and readily practices, the present methods and systems will be described in conjunction with the following figures, wherein.

DESCRIPTION

Figure 1:
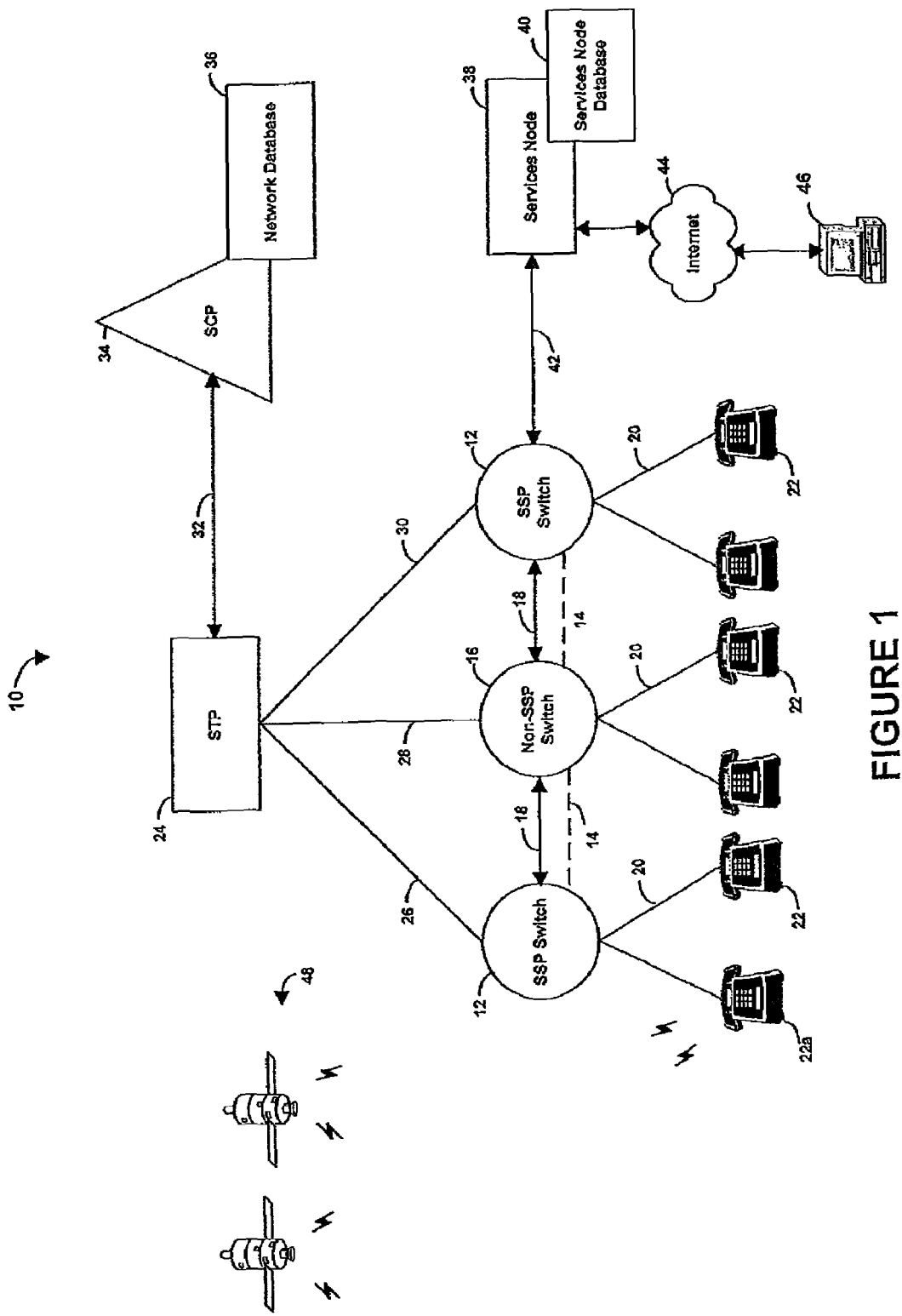
FIG. 1 is a system diagram of one embodiment of an Advanced Intelligent Network (AIN) that can be configured for integration with a public switched telephone network.

It is to be understood that the figures and descriptions of the present methods and systems have been amplified to illustrate elements that are relevant for a clear understanding of the present methods and systems, while eliminating, for purposes of clarity, other elements. Those of ordinary skill in the art will recognize, however, that these and other elements can be desirable. However, because such elements are well known in the art, and because they do not facilitate a better understanding of the present methods and systems, a discussion of such elements is not provided herein.

As used herein, the term "intelligent network" generally refers to a communication network configured for use with the present methods and systems. An intelligent network may be an Advanced Intelligent Network (AIN) or a Wireless Intelligent Network (WIN), for example.

As used herein, the term "traveler" generally refers to the person or unit party to a telecommunication other than the method or system servicing the telecommunication.

As used herein, the term "access device" generally refers to a device for accessing a telecommunications network including, but not limited to, a telephone, a mobile telephone, a computer, a personal digital assistant, a laptop computer, or a pager.

As used herein, the term "'*' code" generally refers to a symbol, such as for example a '*', followed by one or more alphanumeric characters arranged for convenience of traveler memorization, such as *road or *traffic, for example.

As used herein, the term "travel-related information" refers to information that is related to a location, such as traffic information and/or weather information, for example. Travel-related information relating to traffic can include reports describing the number and speed of vehicles on roadways. The reports can be prepared by local television stations, radio stations or web sites for example. The information used to compile the reports can be gathered, for example, manually, from a helicopter or other high vantage point, or automatically, via remote sensors mounted near roadways. Travel-related information relating to weather can include, for example, a general description of the weather conditions expected in a location, or severe weather bulletins for that location. Travel-related information relating to weather is generally compiled by television stations, radio stations, or web sites. Travel-related information related to both traffic and weather can also be related to a direction of travel.

The term "call" refers to an interaction between an access device and a telecommunications network.

In various embodiments, methods and systems for delivering travel-related information with an intelligent network are provided herein. One method embodiment includes establishing communication with an intelligent network through an access device, determining a location of the access device, and obtaining travel-related information. Additional system and computer-readable medium embodiments of the present methods and systems are also provided.

According to various embodiments of the present methods and systems, the intelligent functionality of an Advanced Intelligent Network (AIN) or a Wireless Intelligent Network (WIN) can be utilized. The AIN and WIN are networks that can be configured for use in conjunction with the nationwide public switched telephone network (PSTN) (not shown), to provide enhanced voice and data services and dynamic routing capabilities using two different networks. Voice calls, for example, are transmitted over a circuit-switched network, but the signaling associated with voice calls, is performed on a separate network. Before describing details of the present methods and systems, descriptions of the AIN and the WIN are provided.

FIG. 1 is a block diagram of an Advanced Intelligent Network (AIN) 10 for integration with the PSTN (not shown). The AIN 10 can be employed by a Local Exchange Carrier (LEC) (not shown), and can be utilized by the LEC to allow the LEC to provide call processing features and services that are not embedded within conventional switching circuits of the PSTN.

The AIN 10 can include a number of central office (CO) switches for interconnecting access devices 22 with the PSTN. In FIG. 1, the CO switches are indicated as Service Switching Point (SSP) switches 12 and Non-Service Switching Point (Non-SSP) switches 16. The dashed lines 14 between the SSP switches 12 and the Non-SSP switch 16 indicate that the number of CO switches in the AIN 10 can vary depending on the particular requirements of the AIN 10. The difference between the SSP switches 12 and the Non-SSP switch 16 is that the SSP switches 12 provide intelligent network functionality. Interconnecting the SSP switches 12 and the non-SSP switch 16 are communication links 18 which can be, for example, trunk circuits.

Each SSP switch 12 and non-SSP switch 16 can have a number of subscriber lines 20 connected thereto. The subscriber lines 20 can be, for example, conventional twisted pair loop circuits connected between the switches 12, 16 and the telephone drops for the customer premises, or the subscriber lines 20 can be trunk circuits, such as T-1 trunk circuits, for example. The subscriber lines 20 can connect with a wireline access device 22 such as, for example, a wireline telephone or a fax machine.

For the AIN 10 illustrated in FIG. 1, each SSP switch 12 and non-SSP switch 16 is connected to a signal transfer point (STP) 24 via communication links 26, 28, and 30. The communication links 26, 28 and 30 can employ, for example, the SS7 switching protocol. Also, in one embodiment, the communication links 26, 28, and 30 can be T1 trunk circuits. In one aspect, the STP 24 can be a multi-port high-speed switch that is programmed to respond to the routing information in the appropriate layer of the switching protocol, and that can route data queries to their intended destination.

One of the intended destinations of the data queries from the STP 24 is a service control point (SCP) 34. The STP 24 is in communication with the SCP 34 via a communication link 32, which can also employ the SS7 switching protocol. The communication link 32 can be, for example, a T1 trunk circuit. The SCP 34 can be an intelligent database server such as, for example, an Intelligent Network Service Control Point (available from Lucent Technologies Inc., Murray Hill, N.J.), and can have an associated network database 36 for storing network data. The intelligent functionality of the SCP 34 can be realized by application programs, such as programmable Service Program Applications (SPA), which are run by the SCP 34. The SCP 34 can be employed to implement high volume routing services, such as call forwarding and number portability translation and routing, for example. In addition, another function of the SCP 34 is hosting the network database 36, which can store subscriber information, such as subscriber call management profiles, for example.

The AIN 10 illustrated in FIG. 1 also includes a services node (SN) 38. The SN 38 can be, by way of example, a Compact Services Node (CSN) or an Enhanced Media Resource Server (both available from Lucent Technologies Inc., Murray Hill, N.J.). Also, the SN 38 can be any other type of available AIN-compliant SN. In one embodiment, the SN 38 can host a Services Node Database (SN database) 40. The SN database can contain information such as the travel-related information utilized by the present methods and systems, for example. The SN 38 can be connected to one or more of the SSP switches 12 via a communications link 42 which can be, for example, an Integrated Service Digital Network (ISDN), including BRI (Basic Rate Interface) or PRI (Primary Rate Interface) lines. According to other embodiments, the communications link 42 can be, for example, a T-1 trunk circuit. The SN 38 can be used when an enhanced feature or service is employed that requires an audio connection to the call such as, for example, call return and calling name services. Similar to the SCP 34, the intelligent functionality of the SN 38 can be realized by programmable applications executable by the SN 38.

A set of triggers can be defined for each call at one or more of the SSP switches 12. A trigger in an AIN 10 is an event associated with a particular subscriber line 20. A trigger generates a data query to be sent from the SSP switch 12 servicing the particular subscriber line 20 to the SCP 34 via the STP 24. The triggers can be originating triggers for calls originating from the subscriber premises or terminating triggers for calls terminating at the subscriber premises. A trigger causes a message in the form of a query to be sent from the SSP switch 12 through the STP 24 to the SCP 34.

The SCP 34 can interrogate the network database 36 to determine whether some customized call feature or enhanced service should be implemented for the particular call, or whether conventional dial-up telephone service should be provided. The results of the network database 36 inquiry are sent back from the SCP 34 to the SSP switch 12 via the STP 24. The return message can include instructions to the SSP switch 12 concerning how to process the call. For example, the return message can include instructions to take a special action as a result of a customized calling service or enhanced feature. For an enhanced calling feature requiring the capabilities of the SN 38, the return message from the SCP 34 can include instructions for the SSP switch 12 to route the call to the SN 38. Also, the return message from the SCP 34 can simply be an indication that there is no entry in the network database 36 that indicates anything other than conventional telephone service should be provided for the call. The query and return messages can be formatted, for example, according to conventional SS7 TCAP (Transaction Capabilities Application Part) formats.

The AIN 10 illustrated in FIG. 1 includes only one STP 24, one SCP 34, one network database 36, and one SN 38, although the AIN 10 can further include an additional number of these components as well as other network components that are not included in FIG. 1 for purposes of clarity. For example, the AIN 10 can additionally include redundant SCPs and STPs (not shown) that are configured to function in the event that the STP 24 or the SCP 34 fails. In addition, the AIN 10 can include an Automatic Electronic Switching System (AESS) Network Access Point (NAP) (not shown) in communication with the STP 24, which can be programmed to detect the trigger conditions. Further, the AIN 10 can include regional STPs and regional SCPs (not shown) in communication with, for example, the local STP 24, for routing and servicing long distance calls between different LECs. Also, depending on configuration, certain AIN 10 hardware may be used in a WIN 120, including SCP's 34, STP's 24, and SN's 38, for example.

Figure 2:
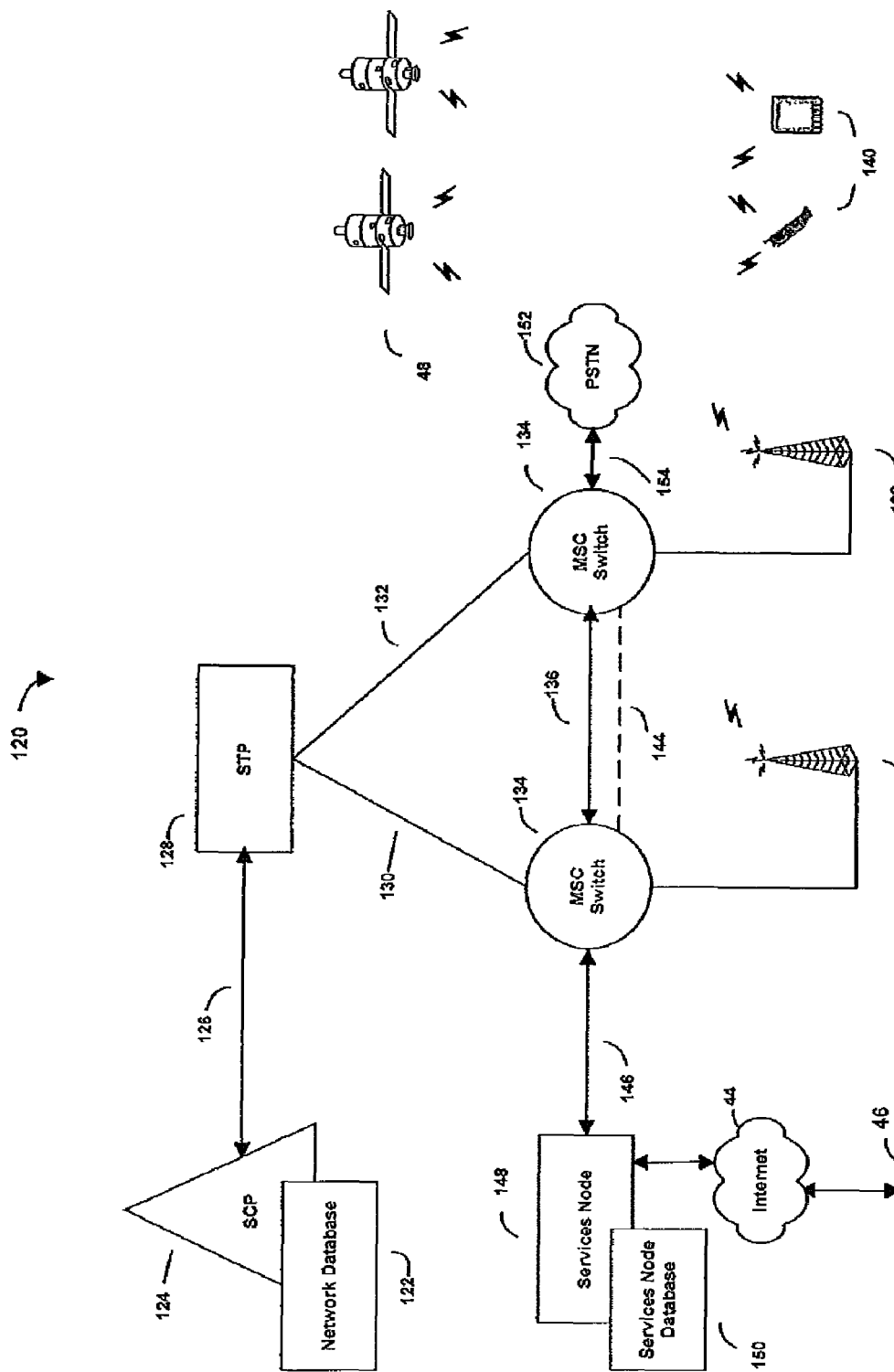
FIG. 2 is a system diagram of one embodiment of a Wireless Intelligent Network (WIN) that can be configured for integration with a public switched telephone network; and, FIG. 3 is a flow diagram illustrating one embodiment of a method of delivering travel-related information utilizing an AIN and an access device.

FIG. 2 is a block diagram of a Wireless Intelligent Network (WIN) 120 for integration with the PSTN 152. The WIN 120 can be employed by a Local Exchange Carrier (LEC) (not shown), and can be utilized by the LEC to allow the LEC to provide call processing features and services that are not embedded within conventional switching circuits of the PSTN.

The WIN 120 can include a number of central office (CO) switches for interconnecting one or more access devices 140 with the PSTN. In FIG. 2, the CO switches are indicated as Mobile Switching Center (MSC) switches 134. The dashed lines 144 between the MSC switches 134 indicate that the number of CO switches in the WIN 120 can vary depending on the particular requirements of the WIN 120. Interconnecting the MSC switches 134 are communication links 136 which can be, for example, trunk circuits.

Each MSC switch 134 can be connected with a cell site 138. The cell site 138 can be in communication with a remote access device 140, such as a mobile phone or a personal digital assistant, for example. Additionally, each MSC switch 134 can be connected to the PSTN 152 via a communication link 154. The communication link 154 can be a T1 trunk circuit, for example.

For the WIN 120 illustrated in FIG. 2, each MSC switch 134 is connected to a signal transfer point (STP) 128 via communication links 130 and 132. The communication links 130 and 132 can employ, for example, the SS7 switching protocol. Also, in one embodiment, the communication links 130 and 132 can be T1 trunk circuits. In one aspect, the STP 128 can be a multi-port high-speed switch that is programmed to respond to the routing information in the appropriate layer of the switching protocol, and that can route data queries to their intended destination.

One of the intended destinations of the data queries from the STP 128 is a service control point (SCP) 124. The STP 128 is in communication with the SCP 124 via a communication link 126, which can also employ the SS7 switching protocol. The communication link 126 can be, for example, a T1 trunk circuit. The SCP 124 can be an intelligent database server such as, for example, an Intelligent Network Service Control Point (available from Lucent Technologies Inc., Murray Hill, N.J.), and can have an associated network database 122 for storing network data. The intelligent functionality of the SCP 124 can be realized by application programs, such as programmable Service Program Applications (SPA), which are run by the SCP 124, The SCP 124 can be employed to implement high volume routing services, such as call forwarding and number portability translation and routing, for example. In addition, another function of the SCP 124 is hosting the network database 122, which can store subscriber information, such as subscriber call management profiles, for example.

The WIN 120 illustrated in FIG, 2 also includes a services node (SN) 148. The SN 148 can be, by way of example, a Compact Services Node (CSN) or an Enhanced Media Resource Server (both available from Lucent Technologies Inc., Murray Hill, N.J.). Also, the SN 148 can be any other type of available WIN-compliant SN. In one embodiment, the SN 148 can host a Services Node Database (SN database) 150. The SN database can contain WIN information such as the travel-related information utilized by the present methods and systems, for example. The SN 148 can be connected to one or more of the MSC switches 134 via a communications link 146 which can be, for example, an Integrated Service Digital Network (ISDN), including BRI (Basic Rate Interface) or PRI (Primary Rate Interface) lines. According to other embodiments, the communications link 146 can be, for example, a T-1 trunk circuit. The SN 148 can be used when an enhanced feature or service is employed that requires an audio connection to the call such as, for example, call return and calling name services. Similar to the SCP 124, the intelligent functionality of the SN 148 can be realized by programmable applications executable by the SN 148.

A set of triggers can be defined for each call at one or more of the MSC switches 134. A trigger in a WIN 120 is an event associated with a particular cell site 138. A trigger generates a data query to be sent from the MSC switch 134, servicing the particular cell site 138, to the SCP 124 via the STP 128. The triggers can be originating triggers for calls originating from the subscriber equipment or terminating triggers for calls terminating at the subscriber equipment. A trigger causes a message in the form of a query to be sent from the MSC switch 134, through the STP 128 to the SCP 124.

The SCP 124 can interrogate the network database 122 to determine whether some customized call feature or enhanced service should be implemented for the particular call, or whether conventional dial-up telephone service should be provided. The results of the network database 122 inquiry are sent back from the SCP 124 to the MSC switch 134, via the STP 128. The return message can include instructions to the MSC switch 134, concerning how to process the call. For example, the return message can include instructions to take a special action as a result of a customized calling service or enhanced feature. For an enhanced calling feature requiring the capabilities of the SN 148, the return message from the SCP 124 can include instructions for the MSC switch 134 to route the call to the SN 148. Also, the return message from the SCP 124 can simply be an indication that there is no entry in the network database 122 that indicates anything other than conventional telephone service should be provided for the call. The query and return messages can be formatted, for example, according to conventional SS7 TCAP (Transaction Capabilities Application Part) formats.

The WIN 120 illustrated in FIG. 2 includes only one STP 128, one SCP 124, one network database 122, and one SN 148, although the WIN 120 can further include an additional number of these components as well as other network components that are not included in FIG. 2 for purposes of clarity.

For example, the WIN 120 can additionally include redundant SCPs and STPs (not shown) that are configured to function in the event that the STP 128 or the SCP 124 fails. In addition, the WIN 120 can include an Automatic Electronic Switching System (AESS) Network Access Point (NAP) (not shown) in communication with the STP 128, which can be programmed to detect the trigger conditions. Further, the WIN 120 can include regional STPs and regional SCPs (not shown) in communication with, for example, the local STP 128, for routing and servicing long distance calls between different LECs. Also, depending on configuration, certain WIN 120 hardware may be used in an AIN 10, including SCP's 124, STP's 128, and SN's 148, for example.

Figure 3:
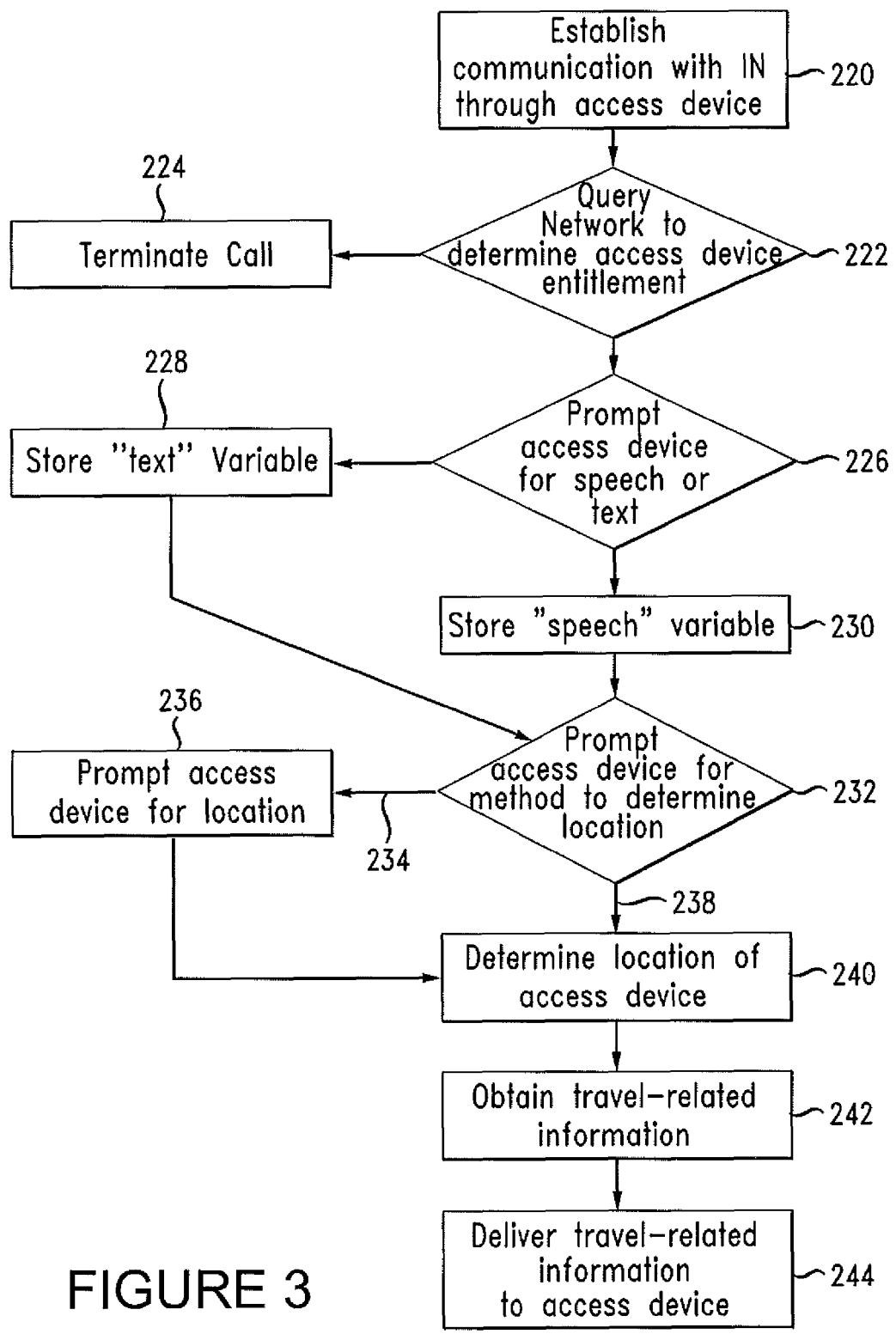

In one embodiment, the present methods and systems can use the intelligent functionality of a WIN 120, as shown in FIG. 2, to obtain travel-related information with a remote access device 140 according to the flow diagram illustrated in FIG. 3. Communication can be established with the WIN 120 through a remote access device 140 in step 220. The remote access device 140 can initiate a communication by sending information to the cell site 138. The information can contain, for example, the digits dialed, the ten-digit number of the remote access device 140, the serial number of the remote access device 140, and the five-digit system identification (SID) of the remote access device 140. The cell site 138 can then forward the information to the MSC switch 134.

In one embodiment of the present methods and systems, the traveler accesses the WIN 120 by entering a '*' code. In this embodiment, when the MSC switch 134 receives the information from the remote access device 140 via the cell site 138, it communicates with the SCP 124 via the STP 128. The SCP 124 then consults a look-up table in the network database 122. The look-up table contains a standard telephone number corresponding to the '*' code. The SCP 124 then sends the standard telephone number to the MSC switch 134 via the STP 128. In subsequent communications between the MSC switch 134 and other components of the WIN 120, the MSC switch 134 can substitute the standard telephone number for the actual characters entered.

In one embodiment, the WIN 120 can determine whether the traveler is entitled to obtain travel-related information in step 222. When the MSC switch 134 receives the information from the remote access device 140 via the cell site 138, a request trigger is activated, The request trigger causes a message to be sent to the SCP 124 via the STP 128. The message can contain the information received by the MSC switch 134 from the remote access device 140. Further, the message can be configured according to the SS7 protocol. The SCP 124 queries its network database 122 to determine if the remote access device 140 is entitled to obtain travel-related information.

The SCP 124 then prepares a return message that can be routed to the MSC switch 134 via the STP 128. If the remote access device 140 is not entitled to obtain travel-related information, then the return message can instruct the MSC switch 134 to terminate the call in step 224. If the remote access device 140 is entitled to obtain travel-related information then the return message can contain instructions for the MSC switch 134 on how to proceed with the call. Based on the instructions from the return message, the MSC switch 134 can create two variables, which can be named "location" and "speech/text" for example.

In one embodiment, the WIN 120 can prompt the remote access device 140 to determine whether the traveler prefers travel-related information in speech or text form in step 226. The MSC switch 134 can prompt the remote access device 140 to determine whether the traveler prefers travel information in speech or text form. If the traveler prefers text travel information then the value of "speech/text" can be set to a "text" value, in step 228. If the traveler prefers speech travel information, then the value of "speech/text" can be set to a "speech" value in step 230.

In one embodiment, the WIN 120 can, in step 232, prompt the remote access device 140 to determine whether a location of the remote access device 140 will be determined by prompting the remote access device 140, or by other means. If the location of the remote access device 140 is to be determined by prompting the remote access device 140, then the remote access device 140 can be prompted in step 236 to determine the location. The value of the entered location can be stored as the "location" variable. The remote access device 140 can also be prompted for a direction of travel. If a direction of travel is entered, it can also be stored as the "location" variable. If the location of the remote access device 140 is to be determined by other means, the location of the remote access device 140 is determined in step 240. The value of this location can then be stored as the "location" variable. A direction of travel of the remote access device 140 can also be determined. If a direction of travel of the remote access device 140 is determined, it can also be stored as the "location" variable. In various embodiments of the present methods and systems, the location of the remote access device 140 can be determined by reference to methods and systems including, but not limited to, global positioning systems, triangulation systems, and Automatic Location Information Systems.

In one embodiment of the present methods and systems, the location of the remote access device 140 is found by reference to a global positioning system utilizing global positioning satellites 48. The remote access device 140 can receive data from the global positioning system utilizing global positioning satellites 48. In one embodiment, the remote access device 140 can process the raw data from the global positioning system utilizing global positioning satellites 48, determine the location of the remote access device 140 from that data, and transmit that location to the MSC switch 134, via the cell site 138. In another embodiment, the remote access device 140 can transmit the raw data from the global positioning system utilizing global positioning satellites 48 to the MSC switch 134, via the cell site 138. The MSC switch 134 can process the data and determine the location of the remote access device 140.

In another embodiment of the present methods and systems, the location of the remote access device 140 is found by triangulation. Triangulation can be implemented by, for example, a Time Difference of Arrival method (TDOA). With a TDOA method, at least two cell sites 138 receive a signal from the remote access device 140. The distance between each cell site 138 and the remote access device 140 can be extrapolated from the time that elapses between the sending of the signal by the remote access device 140 and the receiving of the signal by the individual cell sites 138. From the distance between the remote access device 140 and two cell sites 138 of known location, the location of the remote access device 140 can be calculated. Triangulation can also be implemented by an Angle of Arrival method (AOA). With an AOA method, the direction from which the signal of the remote access device 140 arrives is measured from at least two cell sites 138. The point where these two directions intersect is the location of the remote access device 140. Triangulation can also be implemented by an Enhanced Observed Time Difference method (EOTD). With an EOTD method, a time-synchronized signal is sent from multiple cell sites 138 to the remote access device 140. The difference in arrival time between the signals from the multiple cell sites 138 allows the remote access device 140 to calculate its own location, which is then sent to the cell sites 138.

In yet another embodiment, the location of the remote access device 140 is found by an Automatic Location Information System. According to this system, the ten-digit number corresponding to the remote access device 140 is used to look up the location at which the remote access device 140 is connected to the WIN 120.

In another embodiment of the present methods and systems, the direction of travel of the remote access device 140 can be determined. By way of example, the direction of travel of the remote access device 140 may be extrapolated from the position of the remote access device 140 over a range of times. The position of the remote access device 140 can be determined, by example, by reference to a global positioning system, a triangulation system, or an Automatic Location Information System, as described hereinabove.

Travel-related information can be stored on the SN database 150. Travel-related information can be stored in the form of words and/or numbers describing traffic congestion, for example. Travel-related information can also be in the form of pictures representing traffic congestion. Examples of pictures representing traffic congestion can include pictures of the type displayed on the "http://www.traffic.com" Internet site, for example.

In one embodiment, the present methods and systems can obtain travel-related information in step 242. The MSC switch 134 can prepare a return message and send it to the SN 148. The message can contain the values of the "speech/text" and "location" variables. The MSC switch 134 can establish a data circuit between itself and the SN 148 over communication link 146, which can be an ISDN line, for example. If the value of "speech/text" equals "speech" then the MSC switch 134 can also establish a voice circuit between itself and the SN 148 over communication link 146, which can be an ISDN line. When the SN 148 receives the return message containing the values of the "speech/text" and "location" variables from the MSC switch 134 it can query the SN database 150 to obtain applicable travel-related information in step 242. Applicable travel-related information can pertain, for example, to the location and direction of travel of the remote access device 140.

In one embodiment, the present methods and systems deliver travel-related information to the remote access device 140 in step 244. A voice or text message can be sent to the MSC switch 134 over the voice and or data circuits established in step 242. The MSC switch 134 can then send the information to the cell site 138 which can send it to the remote access device 140.

In one embodiment, the present methods and systems can use the intelligent functionality of an AIN 10, as shown in FIG. 1, to obtain travel-related information with a wireline access device 22 according to the flow diagram illustrated in FIG. 3. Communication can be established with the AIN 10 through a wireline access device 22 in step 220. The wireline access device 22 can initiate a communication by sending information to the SSP switch 12.

In one embodiment of the present methods and systems, the traveler accesses the AIN 10 by entering a '*' code. In this embodiment, when the STP switch 12 receives the information from the wireline access device 22, it communicates with the SCP 34 via the STP 24. The SCP 34 then consults a look-up table in the network database 36. The look-up table contains a standard telephone number corresponding to the code. The SCP 34 then sends the standard telephone number to the STP switch 12 via the STP 24. In subsequent communications between the STP switch 12 and other components of the AIN 10, the STP switch 12 can substitute the standard telephone number for the actual characters entered.

In one embodiment, the AIN 10 can determine whether the traveler is entitled to obtain travel-related information in step 222. When the SSP switch 12 receives the information from the wireline access device 22, a request trigger is activated. The request trigger causes a message to be sent to the SCP 34 via the STP 24. The message can contain the information received by the SSP switch 12 from the wireline access device 22. Further, the message can be configured according to the SS7 protocol. The SCP 34 can query its network database 36 to determine if the wireline access device 22 is entitled to obtain travel-related information.

The SCP 34 then prepares a return message that can be routed to the SSP switch 12 via the STP 24. If the wireline access device 22 is not entitled to obtain travel-related information then the return message can instruct the SSP switch 12 to terminate the call in step 224. If the wireline access device 22 is entitled to obtain travel-related information then the return message can contain instructions for the SSP switch 12 on how to proceed with the call. Based on the instructions the SSP switch 12 can create two variables which, for example, can be named "location" and "speech/text."

In one embodiment, the AIN 10 can prompt the wireline access device 22 to determine whether the traveler prefers travel-related information in speech or text form in step 226. The SSP switch 12 can prompt the wireline access device 22 to determine whether the traveler prefers travel information in speech or text form. If the traveler prefers text travel information then the value of "speech/text" can be set to "text," in step 228. If the traveler prefers speech travel information, then the value of "speech/text" can be set to "speech" in step 230.

In one embodiment, the AIN 10 can, in step 232, prompt the wireline access device 22 to determine whether a location of the wireline access device 22 will be determined by prompting the wireline access device 22, or by other means. If the location of the wireline access device 22 is to be determined by prompting the wireline access device 22, then the wireline access device 22 can be prompted in step 236 to determine the location. The value of the entered location can be stored as the "location" variable. The wireline access device 22 can also be prompted for a direction of travel. If a direction of travel is entered, it can also be stored as the "location" variable. If the location of the remote access device is to be determined by other means, the location of the remote access device 42 is determined in step 240. The value of this location can then be stored as the "location" variable. A direction of travel of the wireline access device 22 may also be determined. If a direction of travel of the wireline access device 22 is determined, it can also be stored as the "location" variable. In various embodiments of the present methods and systems, the location of the wireline access device 22 can be determined by reference to methods and systems including, but not limited to, global positioning systems, triangulation systems, and Automatic Location Information Systems.

In one embodiment of the present methods and systems, the location of a wireline access device containing GPS circuitry 22a is found by reference to a global positioning system utilizing global positioning satellites 48. The wireline access device 22a can receive data from the global positioning system utilizing global positioning satellites 48. In one embodiment, the wireline access device 22a can process the raw data from the global positioning system utilizing global positioning satellites 48, determine the location of the wireline access device 22a from that data, and transmit that location to the SSP switch 12. In another embodiment, the wireline access device 22a can transmit the raw data from the global positioning system utilizing global positioning satellites 44 to the SSP switch 12. The SSP switch 12 can process the data and determine the location of the wireline access device 22a.

In yet another embodiment, the location of the wireline access device 22 is found by an Automatic Location Information System. According to this system, the ten-digit number corresponding to the wireline access device 22 is used to look-up the location at which the wireline access device 22 is connected to the AIN 10.

In another embodiment of the present methods and systems, the direction of travel of the wireline access device 22 can be determined. By way of example, the direction of travel of the wireline access device 22 may be extrapolated from the position of the wireline access device 22 over a range of times. The position of the wireline access device 22 can be determined, for example, by reference to a global positioning system, a triangulation system, or an Automatic Location Information System, as described hereinabove.

Travel-related information can be stored on the SN database 40. Travel-related information can be stored in the form of words and/or numbers describing traffic congestion, for example. Travel-related information can also be in the form of pictures representing traffic congestion. Examples of pictures representing traffic congestion can include pictures of the type displayed on the "http://www.traffic.com" Internet site, for example.

In one embodiment, the present methods and systems can obtain travel-related information in step 242. The SSP switch 12 can prepare a return a message and send it to the SN 38. The message can contain the values of the "speech/text" and "location" variables. The SSP switch 12 can establish a data circuit between itself and the SN 38 over communication link 42, which can be an ISDN line, for example. If the value of "speech/text" equals "speech," then the SSP switch 12 can also establish a voice circuit between itself and the SN 38 over communication link 42, which can be an ISDN line. When the SN 38 receives the return message containing the values of the "speech/text" and "location" variables from the SSP switch 12 it can query the SN database 40 to retrieve applicable travel-related information in step 242. Applicable travel-related information can pertain, for example, to the location and direction of travel of the wireline access device 22.

In one embodiment, the present methods and systems deliver travel-related information to the wireline access device 22 in step 244. A voice or text message can be sent to the SSP switch 12 over the voice and or data circuits established in step 242. The SSP switch 12 can then deliver the travel-related information to the wireline access device 22.

Travel-related information can be gathered and transmitted to the SN's 38, 148 and the SN databases 40, 150 in a number of ways. In one embodiment, people in a helicopter or at another high vantage point can gather travel-related information relating to traffic including the relative number and speed of vehicles on particular roadways. This travel-related information can be relayed to the operator of a personal computer 46, for example. The operator of the personal computer 46 can upload the travel-related information to the SN's 38, 148 and/or SN databases 40, 150 using TCP/IP protocol, for example. The vehicle for this TCP/IP communication can be the Internet 44, for example. In another embodiment, sensors positioned on or near roadways can gather travel-related information relating to traffic. The sensors can gather information regarding the number and speed of vehicles on particular roadways, for example. This travel-related information can be sent to the personal computer 46 with or without a human operator. Also, the personal computer 46 can be located at the place where travel-related information is gathered, such as the helicopter or sensors, for example, or at another location.

The term "computer-readable medium" is defined herein as understood by those skilled in the art. It can be appreciated that various method steps described herein may be performed, in certain embodiments, using instructions stored on a computer-readable medium or media that directs a computer system to perform the method steps. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present methods and systems.

Examples presented herein are intended to illustrate potential implementations of the present telecommunication method and system embodiments. It can be appreciated that such examples are intended primarily for purposes of illustration. No particular aspect or aspects of the example method and system embodiments described herein are intended to limit the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A system for providing travel-related information, comprising:
    a database configured to store subscriber information associated with at least one access device; and
    a control device configured to:
        receive a communication from the access device, the communication including:
            a request for travel-related information, the travel-related information being associated with the location of the access device at the time the communication was initiated;
            a code to identify the communication as a request for access to the database containing the travel-related information; and
            information that identifies the access device;
        determine whether the access device is entitled to receive the travel-related information based on the subscriber information stored in the database;
        if the access device is entitled to receive the travel-related information:
            prompt the access device for selection of a method to determine the location of the access device, wherein the location of the access device is determined according to the selected method, over a range of times, and wherein a direction of travel of the access device is determined by extrapolating the location of the access device over the range of times; and send the travel-related information, including data related to the determined location of the access device and the determined direction of travel of the access device, to the access device, wherein the travel-related information comprises content including weather related to the determined location of the access device and weather related to the determined direction of travel of the access device.

2. The system of claim 1, wherein the travel-related information further includes traffic information.

3. The system of claim 1, wherein the travel-related information is sent to the access device in a format selected from the group consisting of text and speech, wherein the format is specified by user preferences.

4. The system of claim 3, wherein the control device is further configured to receive a selection of the format for delivering the travel-related information from the access device during normal operation and store the selection as a user preference for future delivery of travel-related information.

5. The system of claim 1, wherein the travel-related information comprises photographs of traffic in proximity to the location of the access device.

6. The system of claim 1, wherein the travel-related information is obtained using at least one of aerial reconnaissance vehicles, remote terrestrial sensors and manual observation.

7. The system of claim 1, wherein the information that identifies the access device includes at least one of a phone number, a serial number, and a wireless system identifier.

8. The system of claim 7, wherein the location of the access device is determined based on the access device's phone number.

9. The system of claim 1, wherein the location of the access device is determined based on triangulation of a communication signal to the access device.

* * * * *